Figure 3:
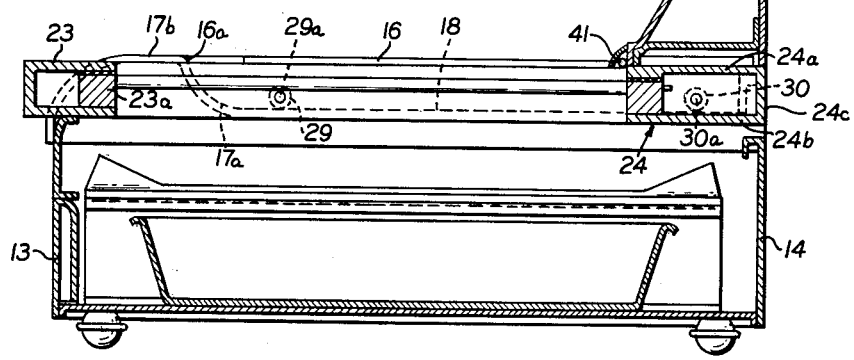

Feb. 20, 1962 J. SAVIO 3,022,410
WALL STRUCTURE FOR ELECTRIFIED COOKING GRATE
Filed Nov. 16, 1959 2 Sheets-Sheet 1
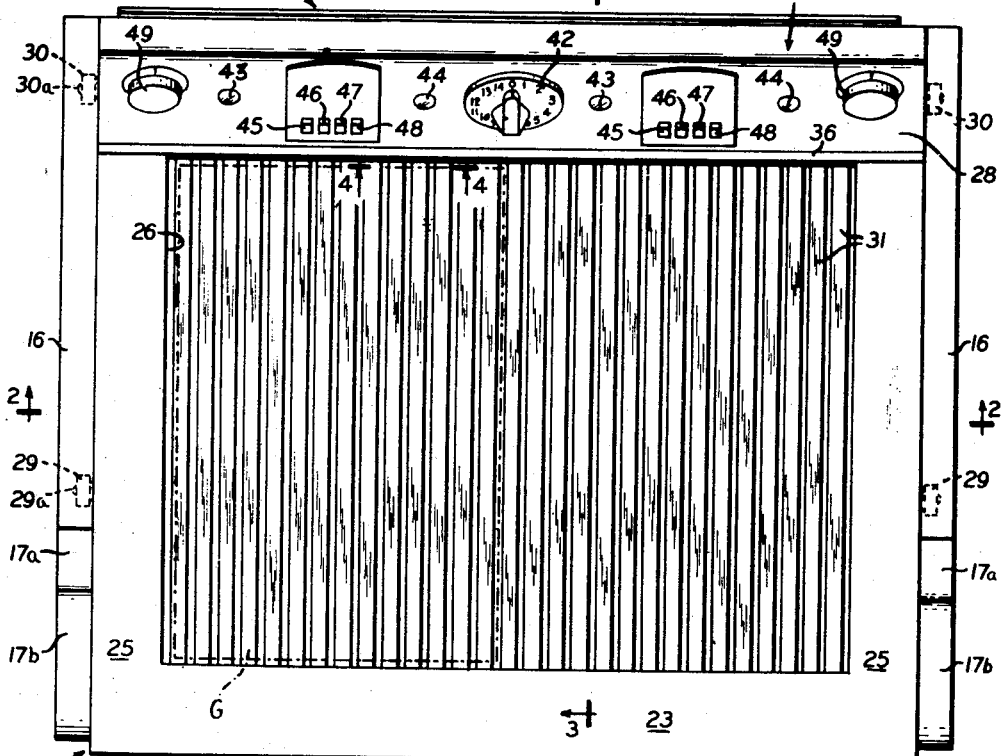
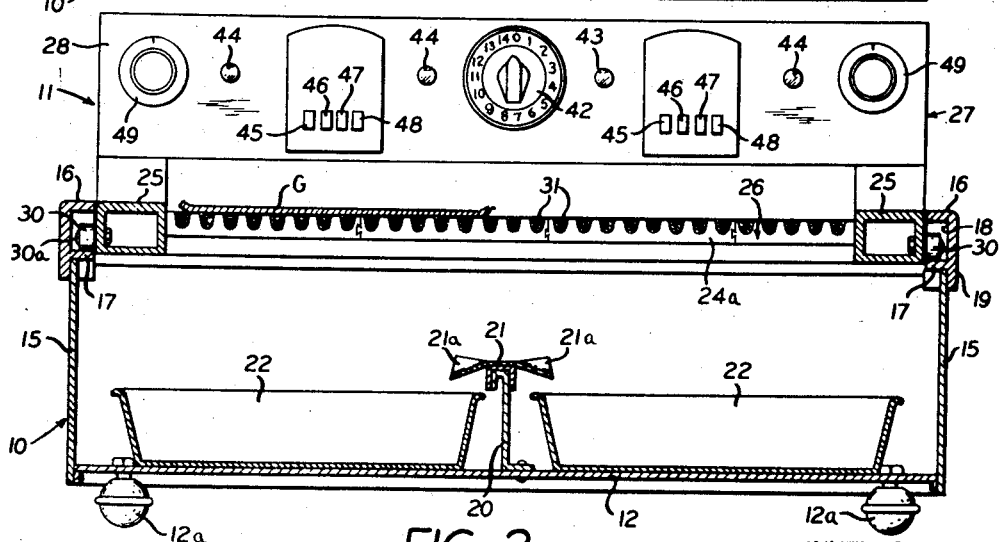
INVENTOR
JOSEPH SAVIO
BY
ATTORNEYS.

Feb. 20, 1962 J. SAVIO 3,022,410
WALL STRUCTURE FOR ELECTRIFIED COOKING GRATE
Filed Nov. 16, 1959 2 Sheets-Sheet 2

INVENTOR
JOSEPH SAVIO
BY Blum Moscovitz
Friedman & Blum
ATTORNEYS.

United States Patent Office 3,022,410
Patented Feb. 20, 1962

3,022,410
WALL STRUCTURE FOR ELECTRIFIED COOKING GRATE
Joseph Savio, Floral Park, N.Y., assignor to Electro-Char Corporation, Bronx, N.Y., a corporation of New York
Filed Nov. 16, 1959, Ser. No. 853,028
11 Claims. (Cl. 219—37)

This invention relates to improvements in electric cooking devices, and in particular relates to an electrified grate suitable for cooking meat and other foods directly upon the heating elements thereof.

This application is a continuation-in-part of my prior U.S. patent application, Serial No. 727,310, filed April 9, 1958, now Patent No. 2,938,102 for Electric Cooking Apparatus.

In said prior U.S. application, I disclose an electrified cooking grate comprising a frame having a central opening with opposed end walls, each of these end walls having a plurality of spaced apertures. Also, a plurality of heating elements each comprising a generally straight, hollow metal tube containing a wire extend across said opening in spaced, generally parallel relationship with the ends of each tube respectively extending into apertures of the respective end walls. In addition, the ends of said wires respectively extend beyond said respective end walls, and I provide means sealing the tubes within the apertures against the passage of grease, liquids and the like through said apertures. In said prior application, I also disclose that the upper surfaces of the tube are generally co-planar to provide a cooking surface, with the space between, immediately above and immediately below the tubes being unobstructed to permit placing food directly upon said cooking surfaces and to permit free flow of air around the tubes. I also disclose current supply means for the wires including control means for limiting current flow through the wires so as to cut off current to the wires at pre-set upper limit temperature of the control means.

The electrified cooking grate of said prior U.S. application is particularly useful in the broiling and other cooking of meats and the like, as fully disclosed in said prior application.

The improvements of this application are particularly directed to the structure of the end walls of the frame, which have the apertures through which the hollow metal tube casings of the grate extend.

As one feature of this invention, the end walls are made in multiple parts in such a way as to permit the replacement of a defective tube casing by merely dismantling the end wall part to which the defective tube is connected, rather than making it necessary to dismantle the entire end wall structure.

Another important feature of this invention resides in improved means in the end wall structure for grounding the tube casings to the end walls.

Other objects and advantages of this invention will become apparent from the following description, in conjunction with the annexed drawings, in which preferred embodiments of the invention are disclosed.

Figure 4:
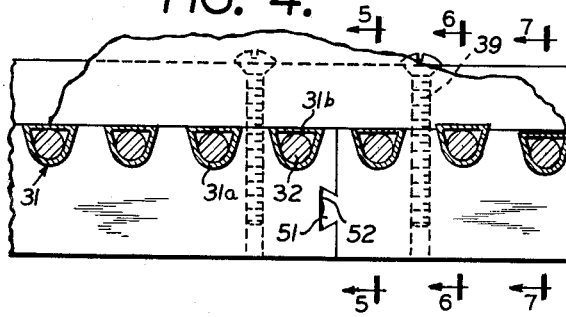
Figure 5:
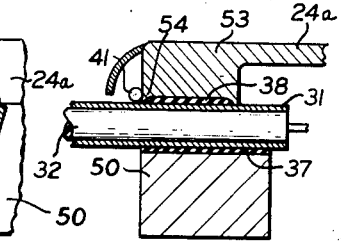
Figure 8:
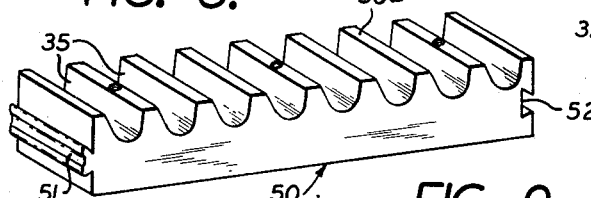
Figure 6:
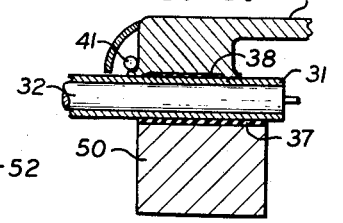
Figure 9:
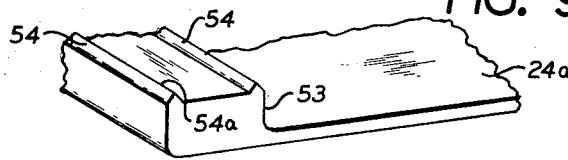
Figure 7:
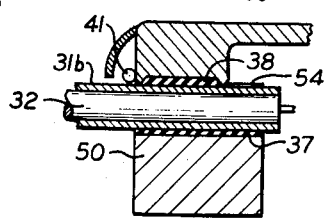
Figure 10:
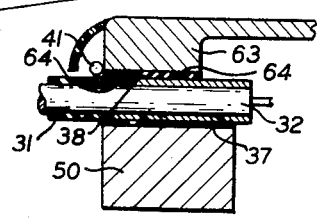

In the drawings,
FIG. 1 is a top plan view of a preferred embodiment of my invention.
FIG. 2 is a section on line 2—2 of FIG. 1.
FIG. 3 is a section on line 3—3 of FIG. 1.
FIG. 4 is a fragmentary section, drawn to enlarged scale, on line 4—4 of FIG. 1.
FIG. 5 is a fragmentary section on line 5—5 of FIG. 4, showing the end wall structure corresponding to a tube which is at the normal level relative to the end wall.
FIG. 6 is a fragmentary section on line 6—6 of FIG. 4, showing the end wall structure corresponding to a tube which is somewhat elevated above the normal level.
FIG. 7 is a section on line 7—7 of FIG. 4, showing the end wall structure corresponding to the position of a tube which is somewhat below its normal level.
FIG. 8 is a perspective view of a section of the end wall.
FIG. 9 is a fragmentary inverted view of another element of the end wall structure.
FIG. 10 is a view similar to FIGS. 5, 6 and 7, but showing a second embodiment of the end wall structure.

Upon reference to the drawings in detail, it will be noted that the cooking device shown in the drawing is of generally rectangular shape and has a base frame 10 and a top frame 11 removably mounted upon said base frame 10. The heating and electrical elements of the stove are preferably mounted upon the removable top frame 11, with the base frame 10 serving as a support and also serving to hold drip pans.

Said base frame 10 has a bottom wall 12, laterally extending front wall 13 and rear wall 14 and longitudinally extending side walls 15. Said base frame 10 preferably has an open top. Wall 12 is optionally supported by legs 12a. A longitudinally extending bracket 19 is mounted upon the upper edge of each side wall 15, by any suitable means. Said bracket 19 has an inturned top flange 16 and a further inturned flange 17 located somewhat below flange 16, so as to define a longitudinal channel 18 between flanges 16 and 17.

Said channel 18 extends from substantially the rear of base frame 10 to a point near the front thereof. At this point, flange 16 terminates and flange 17 is upwardly forwardly inclined at 17a to connect with a flange portion 17b, the rear portion of which is located in substantially the same plane as flange 16 and is spaced forwardly thereof to define an opening 16a. Said flange portion 17b is of convex shape and is forwardly downwardly curved to define a cam surface.

Optionally, a longitudinal partition wall 20 is mounted upon the bottom 12 of base frame 10, by any suitable means. A deflector 21 is optionally and preferably mounted upon the upper end of partition wall 20, and is substantially co-extensive therewith. The side portions 21a of deflector 21 are optionally downwardly outwardly inclined. A pair of generally rectangular drip pans 22, having open tops, can be releasably placed upon bottom wall 12 on opposite sides of partition 20, with the deflector portions 21a extending outwardly of the proximate sides of the pans 22. As a result, drippings from the top frame member 10 either fall directly on the drip pans 22 or are deflected therein by deflector 21.

The top frame member 10 is preferably made of metal and is of generally rectangular shape and has front and rear cross-pieces 23 and 24, as well as longitudinal side arms or pieces 25. These elements cooperate to define a frame having a central opening 26.

Said members 23, 24 and 25 may be of any suitable rigid construction and are optionally of hollow rectangular shape, as is clearly shown in FIGS. 2 and 3.

A control unit 27 is mounted by any suitable means upon the top of rear cross-piece 24, said unit 27 including an upwardly rearwardly inclined front panel 28.

The whole frame 10 is provided with front and rear rollers 29 and 30 mounted by means of pivots 29a and 30a upon the respective sides thereof so as to be turnable about lateral axes. Said frame 11 may be removably mounted upon frame 10 by extending the respective rear rollers 30 into openings 16a and down upon the track flanges 17. Frame 10 may then be rolled rearwardly until the front rollers 29 ride upon the cam flanges 17b and then drop downwardly through openings 16a into channels 18 and onto the flanges 17, to the position shown in FIG. 3. It will be apparent that frame 10 may be readily removed for cleaning or other purposes. Optionally, also, only rollers 29 may be removed from channels 18; and frame 10 may then be swung to vertical position.

In the mounted position, the top face of frame 11 is approximately on a level with the top edges of flanges 16, as is shown in FIG. 2.

A plurality of elongated, optionally straight electric heating grate elements 31 are mounted upon frame 11. These heating elements 31 are laterally spaced from each other and extend longitudinally. Said heating elements 31 are made of conventional components. Thus, each heating element 31 optionally and preferably has a hollow casing 31a which has a flat upper face 31b and is otherwise convex in cross-section. Heating wire 32 extends through said casing 31a.

The hollow, rectangular cross-piece 24 is U-shaped and has a top wall 24a, bottom wall 24b, and rear wall 24c, the two walls 24a and 24b extending laterally and longitudinally and horizontally, and the rear wall 24c extending laterally and vertically. The front of the piece is open, and is closed by additional component members in the form of metal blocks 50. Such blocks 50 are shown in perspective in FIG. 8, and a plurality of blocks 50 may be interlocked to form the front closure for the hollow element 24.

Each said block 24 is generally rectangular and extends laterally and has a flat bottom surface which rests upon the upper surface of wall 24b. Said block 50 has parallel front and rear surfaces, the front surface being alined with the front edges of walls 24a and 24b. Each block 50 is provided at one end with a longitudinally extending dove-tail flange 51, and at its other end with a longitudinally extending dove-tail groove 52. Said flange 51 may be slid longitudinally into groove 52 to interlock successive blocks 50, in the manner shown in FIG. 4.

Said block 50 has a plurality of laterally spaced notches 35 extending downwardly from the top surface thereof. Said notches 35 extend from front to rear of block 50 and correspond in shape to the shape of casings 31a. By way of illustration, and without limitation thereto, there are eight equally spaced notches in the top of each block 50. By way of illustration, four blocks 50 are interlocked in the illustrated construction to form a structure having thirty-two equally spaced notches and capable of receiving thirty-two heating elements 31. It will be apparent that if it is desired to vary the width of the electrified grate, it is possible to vary appropriately the width of the frame and also to provide a different number of interlocking blocks 50.

The top wall 24a of cross-piece 24 is provided with a depending, front, generally rectangular, laterally extending flange or boss 53 which overlies and opposes the respective blocks 50. Clamping screws 39 extend downwardly through wall 24a and boss 53 and into the threaded recesses in each block 50 so as to clamp wall 24a and blocks 50 together. Said top wall boss 53 closes the tops of notches 35, and the casings 31a extend from frame opening 26 into and through said notches 35.

Each heating wire 32 extends rearwardly of block 50 and of casing 31a and connects with a terminal 33. These terminals 33 are connected to any appropriate wiring (not shown).

As an important feature of the invention, each notch 35 is sealed, and a further seal is provided between the upper face of block 50 and the lower face of boss 53. The sealing material may be of any suitable pliable material which is resistant to the cooking heat of the stove and which is resistant to moistures, fat and grease. For example, the sealing compound may take the form of any appropriate silicone sealing compound. Optionally, the sealing compound may be "Silastic 125" or "Silastic 182" manufactured by Dow Corning Corp.

The sealing compound is preferably applied in the form of a sealer 37 extending around each element casing 31a and hence sealing the space between casing 31a and notch 35. Said sealing material 37 also extends over the top surface 31b of casing 31a. Preferably, before block 50 is secured to top wall 24a, a further sealer 38 is applied over the whole top of block 50.

For electrical safety reasons, it is necessary to ground each casing 31a to the frame. As an important feature of this invention, improved means are provided for insuring proper grounding of each casing 31a to the frame.

Boss 53 is provided on its lower surface with one or more laterally extending depending ribs 54. Preferably, but without limitation thereto, there are two such ribs 54 respectively located adjacent the respective front and rear edges of boss 53. Preferably, each said rib 54 is provided with bevelled front and rear surfaces, which meet in a laterally extending, relatively sharp, lower edge 54a of rib 54. When the assembly is secured by the clamping screws 39, the ribs 54 press through the sealing compounds 38 and 37 and into engagement with the upper surface 31b of casing 31a. The knife edges 54 are pressed against the surface 31b to make electrical contact therewith. This ensures the grounding of casing 31a to the frame of the electrified grate.

FIG. 5 shows a particular tube casing 31a whose upper surface 31b is flush with the upper opening of notch 35, or in other words flush with the upper surface 50a of block 50. The ribs 54 are shown as extending through the sealing compounds 38 and 37 and into engagement with the surface 31b. The material of ribs 54 is preferably relatively soft, in comparison to the material of the tube casings 31a, so that the ribs can be somewhat compressed and deformed as a result of the action of the clamping screws 39.

FIG. 6 shows a casing 31a whose upper surface 31b is above the level 50a of block 50. This may be the result of imperfections in the casting or extruding of block 50. FIG. 6 shows an increased compression of the sealing compounds 38 and 37, as compared with FIG. 5. FIG. 6 shows the further deformation of the ribs 54 as compared with FIG. 5.

FIG. 7 shows the condition corresponding to a casing 31a which has its upper surface 31b below the level of surface 50a. This shows a greater thickness of sealing compounds 38 and 37, and shows minimum deformation of ribs 54. However, the ribs 54 still engage casing surface 31b. It will be apparent that tightening clamping screws 39 may be tightened sufficiently so as to ensure that ribs 54 will engage each of the casings 31a. It will be apparent that rib 54 may be almost completely deformed against the surface 50a in the case of a casing such as that shown in FIG. 7.

Optionally, the rear wall structure 23a of front cross-piece 23 may be similar to the above described structure of the front wall structure of rear cross-piece 24. However, the sealing at structure 23a is of somewhat less importance in the event that all of the electrical connections are at the rear of the device. While the exact details of the wiring of this device form no part of my invention, in my preferred embodiments all of the wiring is at the rear of the device.

The structure of FIGS. 1–9 is of particular utility in the event that the frame members are formed by extrusions, in which event the ribs 54 may readily be formed integrally with boss 53. However, this is difficult in the event that the frame members are formed by casting or are fabricated from sheet metal. An alternative construction which meets this problem is shown in FIG. 10. In FIG. 10, the boss 63 on wall 24a is formed with a flat and planar lower surface. However, in place of the ribs 54, a pair of laterally extending wires 64 are positioned between the lower surface of boss 63 and the block surfaces 50a. Optionally, only one wire 64 may be used, or more than two wires 64 may be used. The action of wire 64 is similar to the action of rib 54. The wires 64 are embedded in the sealing layers 38 and 37 and make electrical contact with the top casing surfaces 31b. The extent to which the wires 64 are crushed depends upon the relative level of casing surface 31b and block surface 50a, but by tightening the screws 39, positive contact of wires 64 with each of the casing surfaces 31b is ensured.

Referring further to the control unit 27, this is provided with a laterally and vertically extending partition wall 40, located just behind the front panel 38 and above the open bottom of the control unit and resting upon the top wall 36 of cross-piece 24. The partition wall 28 extends forwardly of partition wall 40 and extends to the top surfaces 31b of elements 31, being at that point spaced slightly in front of wall 24a.

A laterally extending, elongated thermostat element 41 is located between the bottom extension of panel 28 and partition wall 40 and rests directly upon the top surfaces 31b of heating elements 31.

Accordingly, said thermostat element 41, which may be of any appropriate conventional type, rests directly upon elements 31 and hence is in direct heat contact therewith.

In other words, there is no air space between the thermostatic element 41 and the heating elements, but at the same time the thermostat element is completely protected from moisture and from the fats and greases which may be liberated from food during the cooking operation. The heating element 41 is directly responsive to the heat of the heating elements 31, so that the device is accurately directly responsive to the surface cooking temperature of the heating elements 31. This is in contrast with conventional practice, wherein the thermostat element is separated by air or the like from the elements whose temperature is to be measured, causing inaccuracies depending upon the dissipation of heat in the air separating the thermostat element from the heating element.

Said thermostat element 41 may be of any appropriate type. Optionally, and without limitation thereto, said thermostat element 41 may be tubular and may contain a liquid which expands and contracts according to the temperature, and which may be connected to any appropriate control mechanism (not shown). By way of example, and without limitation thereto, said thermostat element 41 may be the temperature responsive element of a unit known as Model EA3, manufactured by Robertshaw-Fulton Controls Company.

By way of illustration, a number of controls are shown as mounted upon the front face of panel 28. These controls include timer 42. As shown, also, the stove is optionally divided into a left-hand unit and a right-hand unit, each of which has independent controls. Each unit in turn has a left-hand section with a pilot lamp 43 and a right-hand section with a pilot lamp 44, as well as an "off" switch button 45, switch button 46 if only the left section is to be "on," switch button 47 if only the right section is to be "on" and switch button 48 if both sections are to be "on" at the same time. These controls, which may be modified in any suitable way, are connected in any appropriate circuit with the heating wires 32 and a source of electric power. The circuit of each stove section includes a thermostat control knob 49 for regulating the cut-off temperature of the system. Thus, said knob 49 optionally has a low heat setting and a high heat setting.

Optionally, there may be an individual thermostat element 41 for each stove section and resting upon a plurality of the heating elements 31 of said stove section. Each thermostat element 41 may control the thermostat for its corresponding stove section.

As a further important feature of the invention, a griddle plate G, preferably made of metal, may be placed directly upon the heating elements 31 of the stove. Preferably, as shown in FIG. 2, griddle plate G substantially covers the heating elements 31 of one of the units, shown illustratively as the left-hand unit. This makes it possible to cook certain food, such as hamburgers, directly upon the exposed elements 31 of the right-hand unit and to cook other food, such as eggs, upon griddle plate G on the left-hand unit.

In accordance with this invention it is unnecessary to provide a thermostatic control upon or within griddle plate G, and it is sufficient to rely upon the thermostat control elements 41 incorporated in the stove. If no griddle plate G is mounted upon the heating elements 31, as shown illustratively in the right-hand unit in FIGS. 1 and 2, the thermostatic control serves primarily to establish an upper heat limit and is not intended or needed to be a precise control.

Thus, in the case of the right-hand unit, without griddle plate G, when the upper limit heat setting of the thermostat control is reached and the current to the heating elements 31 is cut off, the heating elements 31 continue to be heated as the result of the flow of heated air therethrough (the bottom frame may be provided with any suitable air vents to permit the circulation of air to the heating elements 31).

When the heating elements 31 finally cool to the lower limit setting of the thermostat and current begins to be supplied to the elements 31, the elements initially continue to cool as the result of the flow of cool air past the heating elements. From this it follows that on a nominal thermostat setting of 600°, by way of example, there may be an approximate 50° spread between the upper and lower heat limits of elements 31. This is sufficiently accurate for the broiling of meats directly upon the heating elements 31, and the important consideration is that there is a maximum limit to the heating of elements 31.

In contrast, in the case of the left-hand unit of the stove, with griddle plate G illustratively mounted thereon, the variation in heat of elements 31 may be as little as approximately 5° even with the use of ordinary commercial thermostat controls. This is because griddle plate G blocks off air circulation past the elements 31 and also serves as a large metal mass which stores a large quantity of heat. Therefore, when the current cuts off at the upper thermostat setting, the metal mass of griddle plate G immediately absorbs heat from elements 31 and quickly reduces the temperature to the lower limit setting of the thermostat. At the lower limit setting of the thermostat, when current begins to be supplied to elements 31, the griddle plate G continues to release heat to elements 31 and prevents their cooling any substantial amount below the lower limit setting of the thermostat.

The result is to make it possible to use an inexpensive, readily cleaned griddle plate G, with a thermostatic control being supplied by the stove itself.

It is possible to modify griddle plate G by providing it with longitudinally extending slots between the portions of plate G which directly overlie the rod casings 31a. It is also possible to shape the portions of plate G which overlie the rod casings, so that they extend partially over the sides of the rod casings. This results in shielding the rod casings while the space between the rods is open to allow for dripping of liquid, grease and fat, and other substances to the cool zone in the receptacle below the rod casings. This makes it possible for plate G to be used for broiling purposes, because of the fact that the hot grease can drain from plate G to the cool zone below the heating area. This modified construction of plate G also results in making it easier to keep the rod casings clean, and also further reduces the possibility of grease flowing along the rod surfaces to the electrical contacts of the heating elements.

It is further pointed out that in the preferred construction of the surface temperature of the rod casings is approximately 575–700 degrees F. In the case of extremely thick cuts of meat it is possible to provide a supplementary heat source in the form of a battery of infra-red lamps located above the electrified grate with their heat focused on the upper surface of the electrified grate. The result is to pre-heat one surface of the meat while the other surface is being cooked, making it possible to cook the meat more rapidly when it is turned. Furthermore, when the meat is turned the cooked surface continues to be warmed by the heat of the infra-red lamps.

While I have disclosed a preferred embodiment of my invention, and have indicated various changes, omissions and additions which may be made therein, it will be apparent that various other changes, omissions and additions may be made therein, without departing from the scope and spirit thereof.

I claim:

1. An electrified cooking grate comprising a wall, said wall comprising a relatively thick metal panel having a generally planar edge surface and a plurality of apertures extending from said edge surface and between the faces thereof, a plurality of generally coplanar heating elements each comprising a generally straight hollow metal tube containing a wire, said tubes extending in spaced relationship and generally transversely to said panel with the ends of said tubes respectively extending into apertures of said panels, the ends of said wires respectively extending beyond said panel, each said tube having a first peripheral portion abutting and generally conforming to the periphery of said apertures and having a second peripheral portion generally bridging the opening of said apertures in said edge surface, said tube second peripheral portions being generally approximately equi-distant from said edge surface but varying slightly in relationship to said edge surface in the event of manufacturing irregularities in the formation of said apertures, sealing means extending between the casings of said tubes and said apertures and also extending over said tubes and said edge surface and sealing said tubes within said apertures against the passage of grease, liquids and the like through said apertures, said wall also comprising a metal clamping member disposed opposite said edge surface of said panel, means clamping said clamping member to said panel against said edge surface to clamp said tubes in said apertures, and elongated metal contact members extending wholly between said clamping member and said panel edge surface and extending across all of said tubes, said contact members being relatively soft in comparison to said tubes, said clamping members being adapted to be crushed between said clamping member and the tubes which are closest to the clamping member while still being frictionally engaged between said clamping member and the tubes which are the furthest from said clamping member, so as to afford good electrical contact between all of said tubes and said clamping member.

2. An electrified cooking grate comprising a pair of opposing metal clamping members, said clamping members being cooperatively shaped to provide a plurality of apertures extending therethrough and opening upon the proximate surfaces thereof, a plurality of heating elements each comprising a hollow metal tube containing a wire, said tubes extending through said apertures with the ends of said wires extending beyond said tubes, at least one elongated metal contact member disposed between said clamping members and overlying said tubes, said contact member being relatively soft in comparison to said tubes, and means securing together said clamping members sufficiently to crush said contact member between said clamping members and against said tubes to ensure good electrical contact between all of said tubes and said clamping members.

3. An electrified cooking grate in accordance with claim 2, said grate also comprising sealing means extending between the casings of said tubes and said apertures and also extending between said clamping members and sealing said tubes within said apertures against the passage of grease, liquids and the like.

4. An electrified cooking grate in accordance with claim 3, said contact member being in the form of a wire.

5. An electrified cooking grate according to claim 3, there being two of said contact members and these being in the form of parallel wires.

6. An electrified cooking grate according to claim 3, one of said clamping members having a boss thereon extending toward the other clamping member, said boss serving as said contact member.

7. An electrified cooking grate according to claim 3, one of said clamping members having parallel bosses thereon extending toward the other clamping member, said bosses serving as said contact members.

8. An electrified cooking grate according to claim 2, one of said clamping members being in the form of uniform sections, said sections having means for releasably connecting adjacent sections in alined relationship.

9. An electrified cooking grate comprising a wall, said wall comprising a relatively thick metal sectional panel having a plurality of sections, said sections having means releasably connecting adjacent sections in abutting, interlocked alined relationship, said panel having a generally planar edge surface and a plurality of apertures extending from said edge surface and between the faces thereof, a plurality of generally coplanar heating elements each comprising a generally straight hollow metal tube containing a wire, said tubes extending in spaced relationship and generally transversely to said panel with the ends of said tubes respectively extending into apertures of said panels, the ends of said wires respectively extending beyond said panel, sealing means extending between the casings of said tubes and said apertures and also extending over said tubes and said edge surface and sealing said tubes within said apertures against the passage of grease, liquids and the like through said apertures, said wall also comprising a metal clamping member disposed opposite said edge surface of said panel, and means clamping said clamping member to said panel against said edge surface to clamp said tubes in said apertures.

10. An electrified cooking grate according to claim 2, said contact member being in the form of a wire.

11. An electrified cooking grate according to claim 2, one of said clamping members having a boss thereon extending toward the other clamping member, said boss serving as said contact member.

References Cited in the file of this patent

UNITED STATES PATENTS 2,362,757   Lang ------------------ Nov. 14, 1944